United States Patent [19]

Santagiuliana

[11] Patent Number: 5,407,104
[45] Date of Patent: Apr. 18, 1995

[54] DOSING DEVICE FOR LIQUIDS

[75] Inventor: Evans Santagiuliana, Venice, Italy

[73] Assignee: TAPLAST SRL, Dueville, Italy

[21] Appl. No.: 137,133

[22] PCT Filed: May 15, 1992

[86] PCT No.: PCT/EP92/01079

§ 371 Date: Apr. 20, 1994

§ 102(e) Date: Apr. 20, 1994

[87] PCT Pub. No.: WO92/21942

PCT Pub. Date: Dec. 10, 1992

[30] Foreign Application Priority Data

May 29, 1991 [IT] Italy ............... VI91A0094

[51] Int. Cl.⁶ ........................................... G01F 11/26
[52] U.S. Cl. ..................................... 222/425; 222/455
[58] Field of Search ............... 222/450, 451, 453, 455, 222/429

[56] References Cited

U.S. PATENT DOCUMENTS

| | | | |
|---|---|---|---|
| 1,279,014 | 9/1918 | Schimel | 222/451 X |
| 1,687,705 | 10/1928 | Androff | 222/455 X |
| 1,916,819 | 7/1933 | Acosta | 222/455 X |
| 2,343,847 | 3/1944 | Swann | 222/451 X |
| 2,530,012 | 11/1950 | Gronemeyer et al. | 222/451 X |
| 3,176,889 | 4/1965 | Potapenko et al. | 222/453 X |
| 4,357,718 | 11/1982 | Corsette | 222/453 X |
| 4,679,714 | 7/1987 | Blake | 222/453 X |
| 4,728,011 | 3/1988 | Schuster et al. | 222/453 X |
| 4,756,433 | 7/1988 | Lin | 222/454 X |
| 4,807,785 | 2/1989 | Pritchett | 222/453 X |
| 5,044,527 | 9/1991 | Hickerson | 222/451 |

*Primary Examiner*—Andres Kashnikow
*Assistant Examiner*—Kenneth R. DeRosa
*Attorney, Agent, or Firm*—Watson, Cole, Grindle & Watson

[57] ABSTRACT

A dosing device for liquid is provided which includes an upper element having a predosing chamber and an integral cap; an intermediate element which cooperates with the upper element and which connects to the neck of the container; and a sliding dosing element which receives a preselected dose from the dosing chamber and which discharges the dose through an outlet duct in the upper element. The intermediate element has wing-like portions which project downwardly and guide the slidable dosing element along a path axially of the dosing device.

12 Claims, 3 Drawing Sheets

DOSING DEVICE FOR LIQUIDS

BACKGROUND OF THE INVENTION

The invention concerns a dosing device for liquids suited to be applied to the output hole of containers and to be used for the dosing of liquids, mostly for domestic usage like detergents, oils and chemical products to be used in predeterminate amounts.

The need for the chemical industry to produce containers equipped with dosing devices is due to the necessity to optimize the performances of the product contained therein and also to avoid a misuse of the product which, on the one hand, controlled lead to worse results than those obtainable with a controlled dose, and On the other hand could lead to ecological problems due to environmental pollution. For these reasons dosing devices for liquids are a more and more frequent industrial choice.

Dosing devices are known consisting of outlets provided with channels inside which a sphere slides, immersed in the liquid to be dosed and running along a predeterminate distance. When the container is turned upside down from the upright position to the liquid output position, the liquid keeps outflowing as long as the sphere moves toward the output hole until the sphere closes it. This kind of device is described in DE-C-93250. The main disadvantage arising from such devices is that the stroke of the spheres depends on the density of the liquid in which the spheres are immersed, thus the weight of said spheres must be changed according to the density of the liquid to be poured out. Therefore, it is necessary either to change the material the spheres are made of, or to change the size of the spheres, with the obvious disadvantages arising from the realization of dosing devices of different sizes. Further, it must be noted that these types of dosing devices are not very precise, because the speed of the sphere in the closing phase depends also on the liquid head which overhangs it, and therefore, as the container is discharged, the amount of liquid which is delivered by the dosing device varies itself.

DE3715617-A discloses a sealing cap with a dispenser system axially movable with a thread, but there is not a slidable dosage member between said dispenser system and the external part of the cap.

U.S. Pat. No. 1,687,705 discloses a dispensing device in which the dosing chamber does not itself slide, but a sliding ring valve moves along the outer surface of a fixed dosing chamber.

The international patent application PCT/EP90/02106 filed by the same inventor concerns a dosing device comprising an essentially tubular external body, a sliding dosing element inserted in the external body, a co-axial output duct placed inside the external body and a predosing chamber for the liquid placed between the internal surface of the external body and the external surface of the output duct. After the preselected dose has reached the sliding dosing element, the reversal of the container from the upright position to the overturned position makes the dosing element to slide toward the outside, so as to close the communication between the inside of the container and the output duct, while the liquid contained in the dosing element is ejected outside and the liquid contained in the container enters the predosing chamber.

This device overcomes the above mentioned disadvantages, but it presents some difficulty in the construction, because to the three above mentioned elements, i.e. the internal body, the external body, and the sliding dosing element, a connection element is necessarily required between the external body and the neck of the container, which comprises the cap too. Basically, the dosing device of the above mentioned invention consists of four parts separately moulded and then assembled.

SUMMARY OF THE INVENTION

The constant need to reduce the production costs, by maintaining the same quality, has induced the inventor to realize a dosing device for liquids, the main purpose of which is to maintain the dosing precision already known in the patent application PCT/EP/9002106 and, at the same time, to simplify the construction by realizing a dosing device equipped with a cap consisting of only three parts rather than four, thus leading to advantageous savings in materials and assembly time.

Another goal of the invention is that the dosing device can operate correctly without there being the necessity for the container to be turned upside down in a completely vertical position each time. Also, there is the need that a perfect closing is realized when the sliding dosing element reaches the fixed part of the dosing device, so as to avoid that the predosed liquid can mix with the liquid present in the container, altering the dosage.

All the above mentioned goals and others which will be better understood hereafter are reached by realizing a dosing device for liquids, made of plastic material, suited to be applied on the exit hole of a container the main features of which are according to the first claim:

DESCRIPTION OF THE DRAWINGS

Characteristics and details will be better understood from the description of a preferred form of execution of the invention, which is only given by way of illustration, but is not meant Go limit the scope of the invention, such as it is illustrated in the alleged tables of drawings, wherein.

DESCRIPTION OF THE INVENTION

Figure 1:
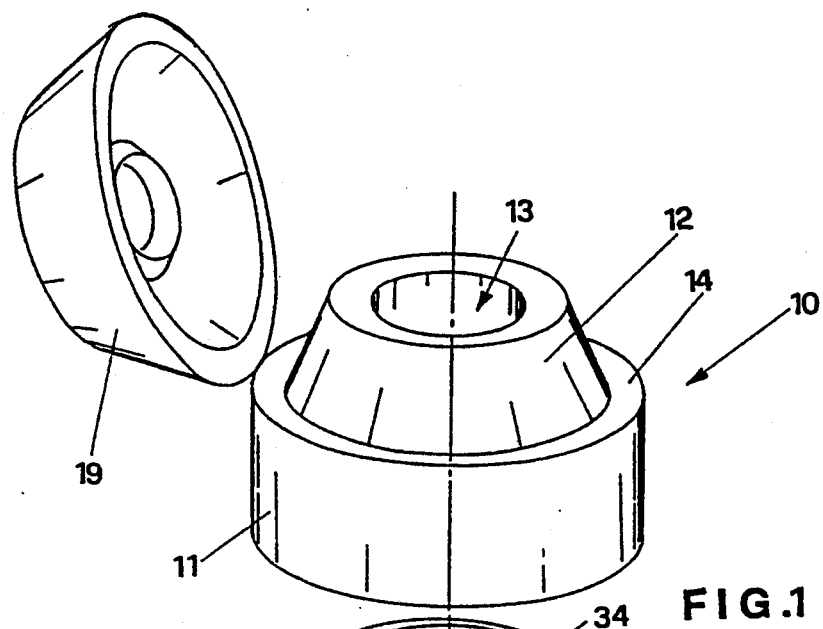
FIG. 1 presents an axionometric view of the upper element connected to the cap of said device.
Figure 2:
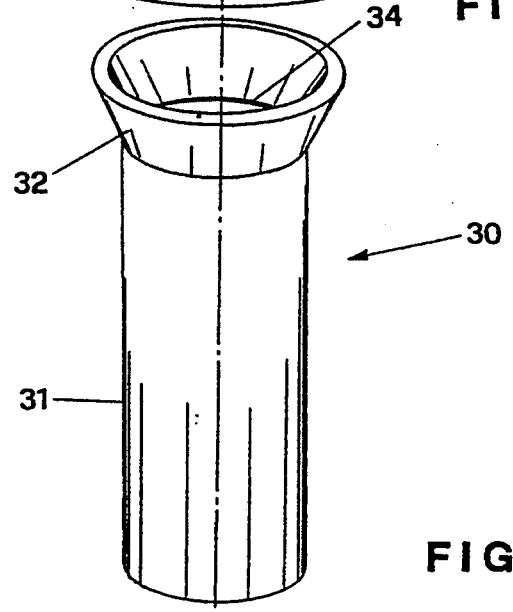
FIG. 2 shows an axionometric view of the sliding dosing element.
Figure 3:
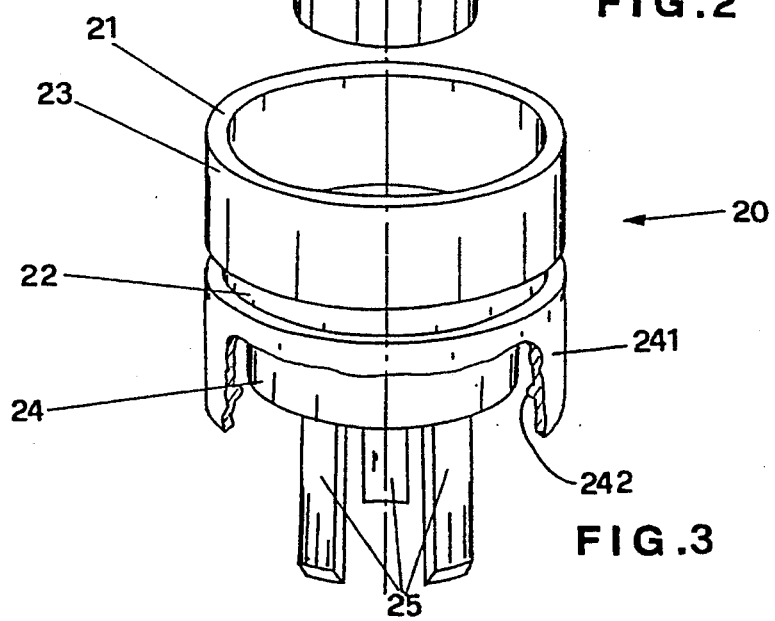
FIG. 3 shows an axionometric view of the intermediate element which co-operates with the upper element and guides the sliding dosing element.

By referring to the above mentioned drawings, and as can be observed in FIGS. 1, 2, 3, the device of the invention is essentially made of only three parts, i.e. the upper part, indicated with 10 in FIG. 1, the intermediate element, indicated with 20 and represented in FIG. 3, and the sliding dosing element, indicated with 30 and represented in FIG. 2.

More in detail, the upper element, indicated as a whole with 10, consists of a cylindrical external wall 11 and an upper frustum-shaped wall 12, presenting in its center a hole 13 defined by a cylindrical wall 16. The plane part 14 which connects the cylindrical vertical wall 11 and the frustum-shaped wall 12 has an inner width suited to contain the thickness of the rim 21 of the intermediate element 20. The connection between the upper element 10 and the intermediate element 20 is obtained by means of a projecting part 15 which engages on a correspondent annular groove 22 that is well visible in FIG. 3. In this way the coupling between the upper element 10 and the intermediate element 20 is realized.

The intermediate element 20 presents superiorly the cylindrical wall 23, and below a tapered cylindrical wall, having a smaller diameter, indicated with 24, which guides the intermediate element inside the hole of the container 41. Coaxial with the wall 24 and more externally to it there is another cylindrical wall 241, presenting an annular projecting part 242 which inserts in a correspondent hollow made on the neck of the container 41 and which guarantees the seal between the intermediate element 20 and the container 41. Said intermediate element 20 can be assured to the neck of the container also by means of a thread, or by gluing a wall of the intermediate element with a suitable wall of the container in proximity of the hole. Inside the wall 24 the wings 25 are arranged equally spaced, having a lengthened downward longitudinal shape. Said wings present an essentially smooth and bent wall so that they make the dosing element 30 to slide guided and free in its inside.

Figure 4:
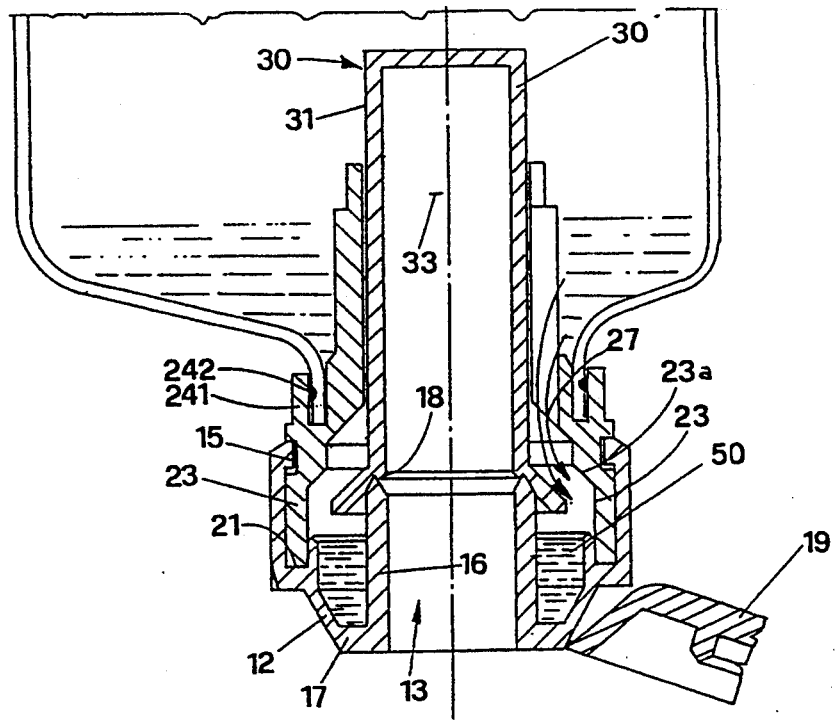
FIG. 4 shows a section of the first charge of the dosing element, that is the transfer of the first dose of liquid from the inside of the container to the predosing chamber.
Figure 5:
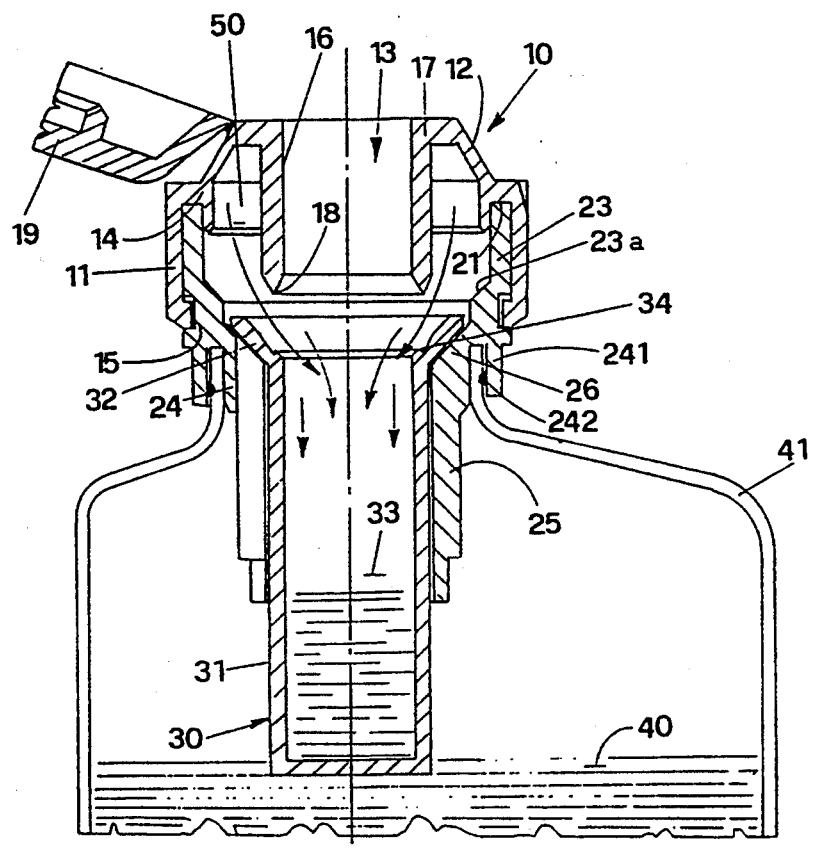
FIG. 5 shows a section of the dosing device in its upright position, during the pouring of the selected dose from the predosing chamber to the sliding dosing element.
Figure 7:
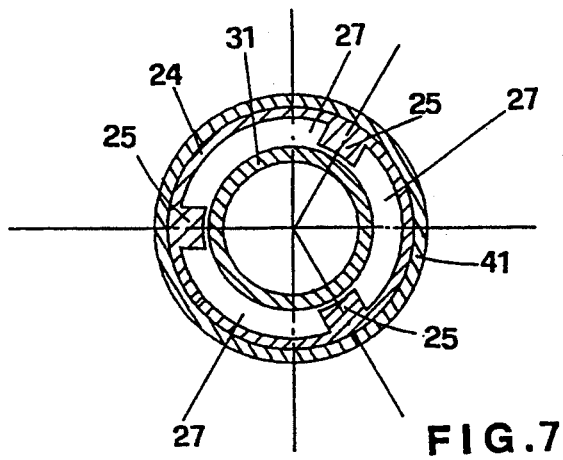
FIG. 7 shows a section according to the line VII—VII in FIG. 6.

Since the longitudinal wings 25 are placed between the cylindrical wall 24 belonging to the intermediate element 20 and the cylindrical external wall 31 of the sliding dosing element 30, an interspace is created, i.e. the passage ports 27 which make the inside 40 of the container 41 to communicate with the predosing chamber 50 limited by the connection between the upper element 10 and the intermediate element 20. More precisely, said predosing chamber 50 is limited centrally by the cylindrical wall 16, by the upper rim 17, by the conical wall 12, by the cylindrical external part 23 and by a conical-surfaced joint 23a belonging to the intermediate element. As can be seen in FIG. 4, when the sliding dosing element 30 rests on the rim 18 of the cylindrical element 16, the chamber 50 has its upper part open. After the container is turned in its upright position, as shown in FIG. 5, the sliding dosing element 30 moves downward and rests on the sloping wall 26 belonging to the wings 25 so that the conical rim 32 of said sliding dosing element closes the passage ports 27 allowing the predosed liquid in the chamber 50 to flow inside the space 33 which constitutes the collection space for the liquid in the sliding dosing element 30.

Figure 6:
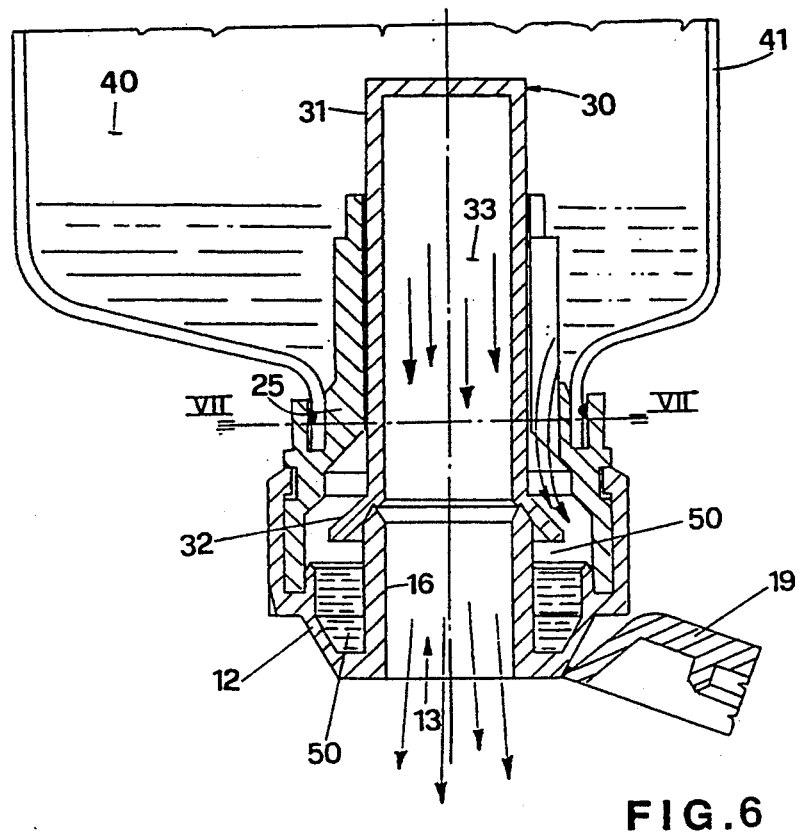
FIG. 6 represents in section the output phase of the selected dose exiting from the sliding dosing element and a selection of the dose passing from the inside of the container to the predosing chamber.

A further reversal of the container 41, as can be observed in FIG. 6, allows the chamber 50 to be recharged with the liquid 40, and allows the liquid contained in the chamber 33 of the sliding dosing element 30 to flow outward through the output duct 13.

In order to avoid the mixing of the predosed liquid collected in the chamber 33 with the liquid coming from the inside of the container 40 and flowing toward the dosing chamber 50, the sliding dosing element 30 is provided with an annular groove 34, realized in correspondence of the variation between the cylindrical surface 31 and the conical surface 32, said hollow receiving the shaped rim 18 of the wall of the output duct 16 belonging to the upper element 10.

In this way a perfect seal can be obtained between the sliding dosing element and the output duct, so avoiding the mixing between the preselected liquid and the liquid to be preselected.

The upper element is also provided with a cap 19 made of plastic material and moulded together with the upper element itself and which closes the hole 13 when the container 41 does not deliver the liquid.

So, all the purposes of the invention are reached, i.e. the realization of a very simple dosing device for liquids which consists of only three parts to be assembled.

Also a dosing device accurate with respect to the dosed amount is obtained, because the sliding dosing element slides on shorter but precise guides, so that jams are avoided; in this way it opens and closes the predosing chamber 50 which connects the output duct and it is avoided that the duct touches the other liquid to be predosed.

However, to the device of the invention could be applied variations and modifications in the construction phase. It is understood, however, that all said variations and modifications do not exceed the scope of the present invention, as specified in the following claims.

I claim:

1. A dosing device for attachment to the outlet of a container movable between an upright and inverted position for dosing liquids therefrom, comprising:
    an upper element being formed with a generally annular predosing chamber and an outlet duct, the predosing chamber having a central axis and including spaced apart walls and a connecting wall portion, said chamber for collecting a predetermined quantity of liquid on inversion of the container from its upright position;
    a generally cylindrical dosing element movable in the direction of the central axis of said device, said dosing element for collecting the predetermined quantity of liquid when the container is returned to its upright position and for delivering the dose when the container is inverted, the output duct being coaxial with the predosing chamber and with the dosing element;
    a cap movable for closing the outlet duct, said predosing chamber and outlet duct being connected to the upper element and, said upper element being molded in a single part together with the cap;
    an intermediate element connected to the upper element and arranged to accommodate the dosing element therein, and including means for attachment of said intermediate element to the container; and
    a plurality of downwardly extending longitudinal wings coaxial with said dosing element for guiding said dosing element and allowing sliding movement thereof within the intermediate element.

2. The dosing device of claim 1 wherein the connecting wall portion includes a frustum shaped outer portion, 3. A dosing device according to claim 1 wherein one of said spaced apart walls comprises a cylindrical inner wall; another of said spaced apart walls comprises a cylindrical outer wall for engaging the intermediate element; and said connecting wall comprises a frustum shaped wall portion, said frustum shape being external of the dosing device and converging towards the central axis outwardly of the duct.

4. The dosing device according to claim 1 wherein the intermediate element includes an outer wall for engaging the upper element and including an inner conical wall portion coaxial with and converging towards the dosing element.

5. The dosing device according to claim 1 wherein the intermediate element and the upper element include mating annular portions.

6. The dosing device according to claim 1 wherein the intermediate element has an external wall formed with an annular groove and the upper element has an outer cylindrical wall formed with an inwardly projecting rim for mating with the groove on the intermediate portion.

7. The dosing device according to claim 6 wherein the annular groove and the complementary rim are in the form of complementary triangular shaped profiles.

8. The dosing device according to claim 1 wherein the longitudinal wings include radial projections extending inwardly off the intermediate portion and the dosing element comprises a cylindrical element having an outer wall portions for engaging the radial projections, said intermediate element and said dosing element being spaced apart and said longitudinal wings forming passage ports therebetween extending from an inlet of the dosing device to the predosing chamber.

9. The dosing device according to claim 1 wherein the dosing element has an open outlet portion in the form of a frustum shaped rim extending away from said axis in the direction of the outlet duct and widening in the direction of the predosing chamber, and said predosing chamber including an inner one of said spaced apart wall portions having a frustum shaped mating part for engaging the rim of the dosing element-such that the frustum shaped rim and the frustum shaped mating part engage when the container is inverted.

10. The dosing device according to claim 1 wherein the intermediate member includes an inwardly extending annular projection for engaging the container.

11. The dosing device according to claim 1 wherein the intermediate member includes an inwardly projecting threaded end for engaging the container.

12. The dosing device according to claim 1 wherein the intermediate portion is attached to the container by means of a glue.

* * * * *